United States Patent

Glauber et al.

[19]

[11] Patent Number: 5,887,566
[45] Date of Patent: Mar. 30, 1999

[54] GAS ENGINE WITH ELECTRONICALLY CONTROLLED IGNITION OIL INJECTION

[75] Inventors: Robert Glauber, Friedberg; Peter Eilts, Stadtbergen; Rudolf Schroll; Kai Rieck, both of Augsburg; Lars Dier, Aystetten, all of Germany

[73] Assignee: Man B&W Diesel Aktiengesellschaft, Augsburg, Germany

[21] Appl. No.: 864,260

[22] Filed: May 28, 1997

[30] Foreign Application Priority Data

May 28, 1996 [DE] Germany ............... 196 21 297.9

[51] Int. Cl.$^6$ .................. F02B 3/00; F02M 19/00
[52] U.S. Cl. ...................... 123/275; 123/27 GE
[58] Field of Search ............ 123/27 GE, 526, 123/275

[56] References Cited

U.S. PATENT DOCUMENTS

| | | | |
|---|---|---|---|
| 4,742,801 | 5/1988 | Kelgard | 123/27 GE |
| 4,831,993 | 5/1989 | Kelgard | 123/27 GE |
| 5,293,851 | 3/1994 | Schaub | 123/275 |
| 5,297,520 | 3/1994 | Danyluk | 123/299 |
| 5,355,854 | 10/1994 | Aubee | 123/526 |

FOREIGN PATENT DOCUMENTS

| | | | |
|---|---|---|---|
| 40 33 843 | 5/1991 | Germany | F02B 19/14 |
| 43 26 949 | 2/1995 | Germany | F02D 43/00 |

OTHER PUBLICATIONS

Article entitled "Konzeptstudie für Zündstrahlmotoren für unterschiedliche Anwendungen" by Olaf Berger dated Mar. 1994, 94 pages published at Universität des Landes Hessen.

Article entitled "Dual-Fuel engine Developments At MAN B & W" by Andreas Albrecht, dated Oct. 1995, pp. 18–19 published in Diesel & Gas Turbine Worldwide.

Article entitled "Alternative Fuels—Gas Diesel" dated Mar. 4, 1998 by Wärtsilä Vasa, 4 pages, published in Technology Review.

Article entitled "The Merits of The Gas-Diesel Engine" dated Feb. 17, 1998 written by Rolf Vestergren, pp. 1–8.

Article entitled "The Future Potential of the Diesel Process" dated London 1993, written by D. Paro, G. Lifenfeldt and D. Jay, published by International Council on Combustion Engines, 8 pages.

Primary Examiner—Thomas N. Moulis
Attorney, Agent, or Firm—Cohen, Pontani, Lieberman, Pavane

[57] ABSTRACT

A gas engine with electronically controlled and/or regulated injection of relatively small quantities of injection oil in such a way as to improve the metering accuracy of the injection oil quantity, the flexibility with which the required ignition oil quantity is provided and the ability to freely preset the timing of ignition oil injection. The engine comprises a separate electronically controllable injection system for each cylinder including at least one ignition oil injection device 13 connected via an injection line 14 to a separate ignition oil hydraulic pump 16 which is in fluid communication with a pressure accumulator 15. An electronically controllable switching device 19 associated with the injection device 13 is electronically connected to an engine control device 20 that controls, regulates and monitors the ignition oil injection.

11 Claims, 8 Drawing Sheets

GAS ENGINE WITH ELECTRONICALLY CONTROLLED IGNITION OIL INJECTION

BACKGROUND OF THE INVENTION

1. Field of the Invention

The present invention is directed to a gas engine with electronically controlled and/or regulated ignition oil injection.

2. Description of Related Art

Internal combustion engines which are operated only or primarily with gaseous fuels are referred to as gas engines. Gas engines include, on the one hand, known Otto gas engines with electric ignition and, on the other hand, gas engines referred to as pilot-ignition gas engines or ignition oil gas engines in which ignition of the fuel-air mixture is achieved by the auto-ignition of a small quantity of injected liquid ignition oil. The principle of injection of an auto-ignition oil is also applied in dual-fuel engines or diesel/gas engines, for example, as disclosed in German Patent publication 40 33 843 A1.

Depending on its application profile, pilot-ignition gas engines or diesel/gas engines may be constructed with two different combustion processes which are known from diesel engines. These diesel engine combustion processes are classified based on the construction of the combustion chamber. On the one hand, diesel engines constructed with an undivided combustion chamber are known as direct injectors. On the other hand, chamber engines are constructed with a divided combustion chamber whereby the overall combustion chamber is divided into two individual combustion chambers by a more or less sharply narrowed orifice. That portion of the combustion chamber which includes the one defining wall formed by the piston is referred to as the main combustion chamber and the other portion of the combustion chamber is the precombustion chamber. Depending on the construction of the precombustion chamber, the engine is referred to either as a precombustion chamber engine or a swirl combustion chamber engine. In diesel engines with a divided combustion chamber, diesel fuel is injected into the precombustion chamber. In a similar manner, a pilot-injection gas engine or diesel/gas engine may be constructed as a direct injector or as a chamber engine, depending on whether the ignition oil is injected directly into the main combustion chamber or into the precombustion chamber respectively.

If the ignition oil is injected into the precombustion chamber, a fuel-air mixture with a relatively large amount of excess air may be ignited very uniformly and precisely in the main combustion chamber thereby desirably producing only a relatively small amount of harmful emissions and achieving a relatively high engine efficiency. Thus, if a low-pollutant, environmentally sound energy conversion is preeminent, the preferred construction is injection of the ignition oil into the precombustion chamber. In addition, for purely diesel operation of a diesel/gas engine, the main fuel quantity is preferably injected directly into the precombustion chamber.

In view of increasingly stringent emission controls, e.g., as defined by German technical guidelines governing air quality, for industrial installations, power plants, pumping stations and compressor plants, the reduction in the amount of pollutant of nitrogen oxides $NO_x$ is an increasingly prominent factor in engine development.

In gas engines in which the fuel-air mixture is ignited by the injection of an auto-igniting ignition oil, $NO_x$ emission standards may be maintained in gas operation without the need for catalytic aftertreatment of the exhaust only by injecting the smallest possible amount of ignition oil which would still allow for reliable ignition of the fuel-air mixture.

Various methods are already known for providing small quantities of ignition oil. For example, the ignition oil injection valve may be controlled by the main injection pump in conjunction with a metering valve for the ignition oil quantity, as for example disclosed in U.S. Pat. No. 5,297,520. Injection devices with dual nozzles are also known. Alternatively, in a known manner, a separate injection pump may be provided for ignition oil injection in addition to the main injection pump for main injection. A joint camshaft may be used as the driving means for the main injection pump and the ignition oil injection pump, or alternatively, separate camshafts may be provided.

These known solutions for controlling ignition oil injection have limited flexibility in controlling the quantity of ignition oil, selecting the injection pressure, adjusting the beginning of delivery the realization of which is very complicated and adjusting the beginning of ignition oil injection. Thus, consistently reliable metering of the quantity of ignition oil is not ensured.

For the reasons stated above ignition oil quantities less than or equal to approximately 1% of the diesel consumption at full load are desirable, however, with such low ignition oil quantities the disadvantages of the known solutions must be avoided in order to meet efficiency, emissions and operating reliability demands.

Management or control systems are known in automobile engine design, especially in Otto engines, for setting adjustment variables such as the ignition angle, injection timing and throttle position depending on the load point. For example, German Patent publication 43 26 949 A1 discloses a method for deriving a load variable from measured cylinder pressure signals for characterizing the load point and using these load variables together with the respective engine speed to determine the optimum ignition angle by means of a characteristic diagram input in the engine control computer.

It has been recognized in connection with diesel engines that it is very important to have the greatest possible flexibility in the injection system. Thus, different electronically controlled injection systems have been developed. One such system is the pump-nozzle system which is advantageous in that it produces relatively high injection pressures and reduces the dynamic effects in the hydraulic lines. However, in this system the injection pressure is disadvantageously dependent on the speed of the engine.

Other injection systems, known collectively as common rail systems, provide a freely selectable injection pressure at all engine operating points. These systems may be roughly classified depending on the fuel pressure in the common fuel line of the cylinders. In one group of common rail systems, the pressure in the common fuel line is equal to the injection pressure (high-pressure common rail), whereas in the second group the pressure in the common fuel line is substantially lower than the injection pressure (low-pressure common rail). In this second group, hydraulic pressure intensifiers comprising part of the injection device increase the low pressure from the rail to the necessary high pressure required for injection. In both cases, a hydraulic delivery pump (hydraulic pump) produces the required diesel fuel pressure in the common fuel line of the cylinders, that is, high pressure in the case of the high-pressure common rail and low-pressure in the case of low-pressure common rail. A pressure accumulator is generally disposed between the hydraulic pump and the injection device in order to reduce the dynamic effects in the pressure lines. Thus, the injection pressure is independent of the injection quantity and engine speed. The injection process may be initiated electrically and the nozzle needle may be actuated by an independent electronic control. Design and construction of the injection device varies depending on the type of common rail and also within each rail group. In these common rail systems, the pressure at the injection nozzle is approximately constant during the injection process.

It is the object of the present invention, therefore, to provide a gas engine with electronically controlled and/or regulated injection of relatively small quantities of ignition oil in such a way that the accuracy with which the quantity of injected ignition oil is metered, the flexibility in providing the quantity of ignition oil required, and the ability to optionally preset the time point of ignition oil injection are improved while maintaining $NO_x$ emission standards in gas operation without the need for catalytic aftertreatment of the exhaust.

SUMMARY OF THE INVENTION

The present invention is directed to a gas engine with electronically controlled and/or regulated ignition oil injection comprising a separate injection system for each cylinder with at least one ignition oil injection device arranged in the cylinder head and connected, via an injection line, to a separate ignition oil hydraulic pump in fluid communication with a pressure accumulator. An electronically controllable switching device associated with the ignition oil injection device is electronically connected to an engine control device for controlling, regulating and monitoring ignition oil injected.

The parameters determining the start and duration of switching of the electronically controlled switching device may be preset optionally in order to adjust the ignition oil quantity as needed such that the liquid ignition oil fuel under pressure is injected through the injection nozzle starting at a specified point in time and for a precisely determined duration of time.

A pressure accumulator in fluid communication with the ignition oil hydraulic pump is used to maintain an approximately constant pressure curve at the injection nozzle.

In view of the relatively short injection period, the electronically controllable switching device must provide relatively short switching times such as for example, a relatively fast-switching solenoid valve that is capable of executing relatively quick opening and closing processes. Thus, the injection process may be configured in multiple steps and the quantity of fuel delivered during the ignition delay kept relatively small. In addition to a free adjusting range for the beginning of injection, relatively high dynamic regulation of the beginning of injection may also be achieved.

Electronically controlling ignition oil injection in this way generates an approximately constant injection pressure which is independent of engine speed and load. A microprocessor in the engine control device processes all input signals, e.g., actual speed and reference speed, angular position of the crankshaft, sensors and movement transducers for sensing knocking, and generates an output signal for controlling the switching device and ignition oil injection. The switching device may be controlled and/or regulated as desired using characteristic curves or characteristic diagrams stored in the microprocessor of the engine control device. Furthermore, the injection of the ignition oil may be adapted to changed fuel characteristics by modifying the characteristic curves or characteristic diagrams.

Besides a small quantity of ignition oil of preferably approximately 1% of the full-load quantity of diesel, the leanest possible fuel-air mixture, e.g., a large surplus of air, is preferred in order to satisfy stringent emission standards. Injection of the ignition oil into the precombustion chamber is also preferred for this same purpose. The precombustion chamber construction reinforces the relatively low firing power of the very small quantity of ignition oil. The ignition oil is injected into the precombustion chamber towards the end of the compression stroke and ignites the mixture quantity in the precombustion chamber. The ignition flares exiting from the precombustion chamber through the injection ducts, in turn, initiate combustion of the lean fuel mixture in the main combustion chamber. Due to the great firing power of these ignition flares, even very large combustion chambers and extremely lean mixtures necessary in order to satisfy $NO_x$ emission standards without the need for catalytic aftertreatment of the exhaust may be ignited reliably and substantially uniformly with this device.

Further, the present inventive gas engine with electronically controlled and/or regulated ignition oil injection may be used to control one or more ignition oil injection devices per cylinder regardless of whether one or more ignition oil injection devices are connected directly to the main combustion chamber or are arranged so that the ignition fuel flows through one or more precombustion chambers per cylinder.

Since the electronically controllable switching device is arranged in the region of the corresponding ignition oil injection device or alternatively constructed integral to the corresponding ignition oil injection devices so as to form a single structural device, the supply pressure of the ignition oil is applied until immediately before the injection device in order to substantially reduce the influence of the dynamic effect in the injection lines on the ignition oil injection. For the rest, the ignition oil injection device may be, for example, an injection valve, and the electrically controllable switching device may be, for example, a switching valve.

Since the switching device for regulating ignition oil injection may be controlled by a program stored in the engine control device this program may be designed to perform flexible knock prevention in pilot-injection gas engines or diesel/gas engines. Knocking may be detected, for example, using a knock sensor mounted on the engine that detects the structure-borne noise vibrations of the crankcase. The signals generated by the knock sensor are then analyzed in the microprocessor of the engine control device and the required adjustments are, accordingly, made to the engine, e.g., to the parameters of the ignition oil injection. An engine constructed to include knocking detection means may be driven relatively close to the knocking limit, whereas, in contrast, a relatively large margin of safety must be maintained in relation to the knocking limit in an engine without knocking detection means.

Conventional diesel/gas engines have previously been designed to always be driven with a relatively large margin from the knocking limit. Electronically controlling ignition oil injection is advantageous in that it allows for steps to be taken to counteract for detected detonating combustion. In a first corrective step, the timing of the ignition oil injection may be retarded. If knocking occurs again, the timing may be delayed even more. Should these steps not prove to be adequate, more drastic corrective measures may be taken such as gradually reducing the engine output. The control program for regulating ignition oil injection may be designed such that these corrective steps are canceled one at a time after a certain period of time in order to test whether the operating factors which are the cause of the knocking have returned to normal, and if so, to restore the basic adjustments for engine output and the ignition oil injection parameters.

The self-regulating system provides flexible presetting of the ignition oil injection timing so that the design point and operating point of the engine may be brought closer to the knocking limit thereby increasing performance and improving overall efficiency without exceeding acceptable $NO_x$ emission standards.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
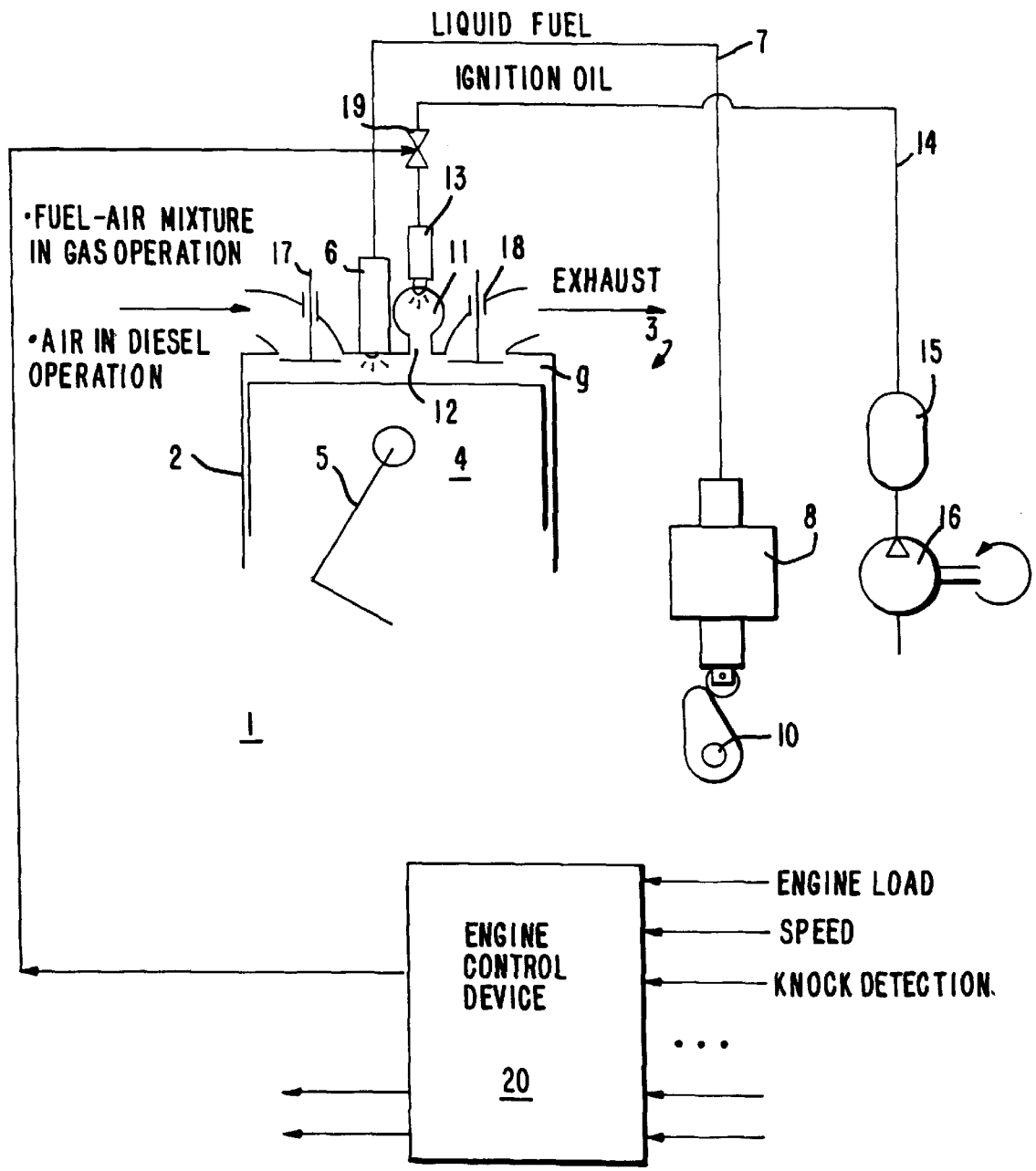
FIGS. 1 through 4 depict various embodiments of the diesel/gas engine with electronically controlled ignition oil injection in accordance with the present invention.

FIG. 1 shows a diesel/gas engine 1 with a cylinder 2. The cylinder 2 includes a cylinder head 3 which is fitted in a known manner to a cylinder block so as to be sealed. Only the upper region of the cylinder block with the piston 4 and articulated connecting rod 5 is shown.

A main injection nozzle 6 is arranged in the cylinder head 3 through which liquid fluid is injected directly into a main combustion chamber 9 via a fuel line 7 by a main injection pump 8. The main injection pump 8 is driven by means of a camshaft 10 at the engine. In an alternative embodiment, the main injection of liquid fuel may be performed using a common rail system.

A precombustion chamber 11 is arranged in the cylinder head 3 in the region of the main injection nozzle 6 and is connected to the main combustion chamber 9 by a connecting channel 12. Although only one connecting channel 12 is shown in FIG. 1, two or more connecting channels are also within the intended scope of the invention. An ignition oil injection device 13 is arranged in the cylinder head 3 upstream of the precombustion chamber 11 and is supplied with ignition oil via an injection line 14 by an ignition oil hydraulic pump 16 in fluid communication with a pressure accumulator 15.

The pressure in the ignition oil injection system 13, 14, 15 is produced by the hydraulic pump 16 and may therefore be selected in accordance with requirements. Thus, a substantially higher accuracy in the amount of ignition oil injected per work cycle is realized by freely selecting the pressure at the ignition oil injection device independent of the load and speed of the engine.

The charge of the engine may be varied in a known manner using inlet and outlet valves 17, 18 in the main combustion chamber 9 and need not be described further. As shown in the figures, the combustion gas is mixed with the combustion air already outside of the combustion chamber (external formation of mixture). In an alternative embodiment not shown, the combustion gas may be injected at a relatively high pressure into the combustion chamber, after the inlet valves have been closed, and mixed with the combustion air therein (internal mixture formation).

An electronically controllable switching device 19 is associated with the ignition oil injection device 13 for adjusting the beginning of injection and the amount of ignition oil injected as needed by setting the start of switching and duration of switching. These parameters may be preset in an optional manner. By way of non-limiting example, if the quantity of ignition oil absolutely required, i.e., in grams per work cycle, is higher at partial load than at full load, the quantity of ignition oil injected may be adjusted by presetting the parameters accordingly without having to change the injection arrangement while the engine is running.

Switching device 19 is electronically connected to an engine control device 20 for controlling, regulating, and monitoring ignition oil injection. Engine control device 20 includes a microprocessor in which is stored characteristic diagrams or characteristic curves of operating variables of the engine, for example, stored values of the beginning of ignition oil injection.

Therefore, the time at which the ignition oil is injected may be preset optionally and is not tied to a camshaft. The timing of injection of the ignition oil may be varied as needed by the engine control device 20 such as for example if an earlier injection time is more advantageous at partial load than at full load. The most favorable timing in each case may, therefore, be set depending on the particular load.

Figure 2:
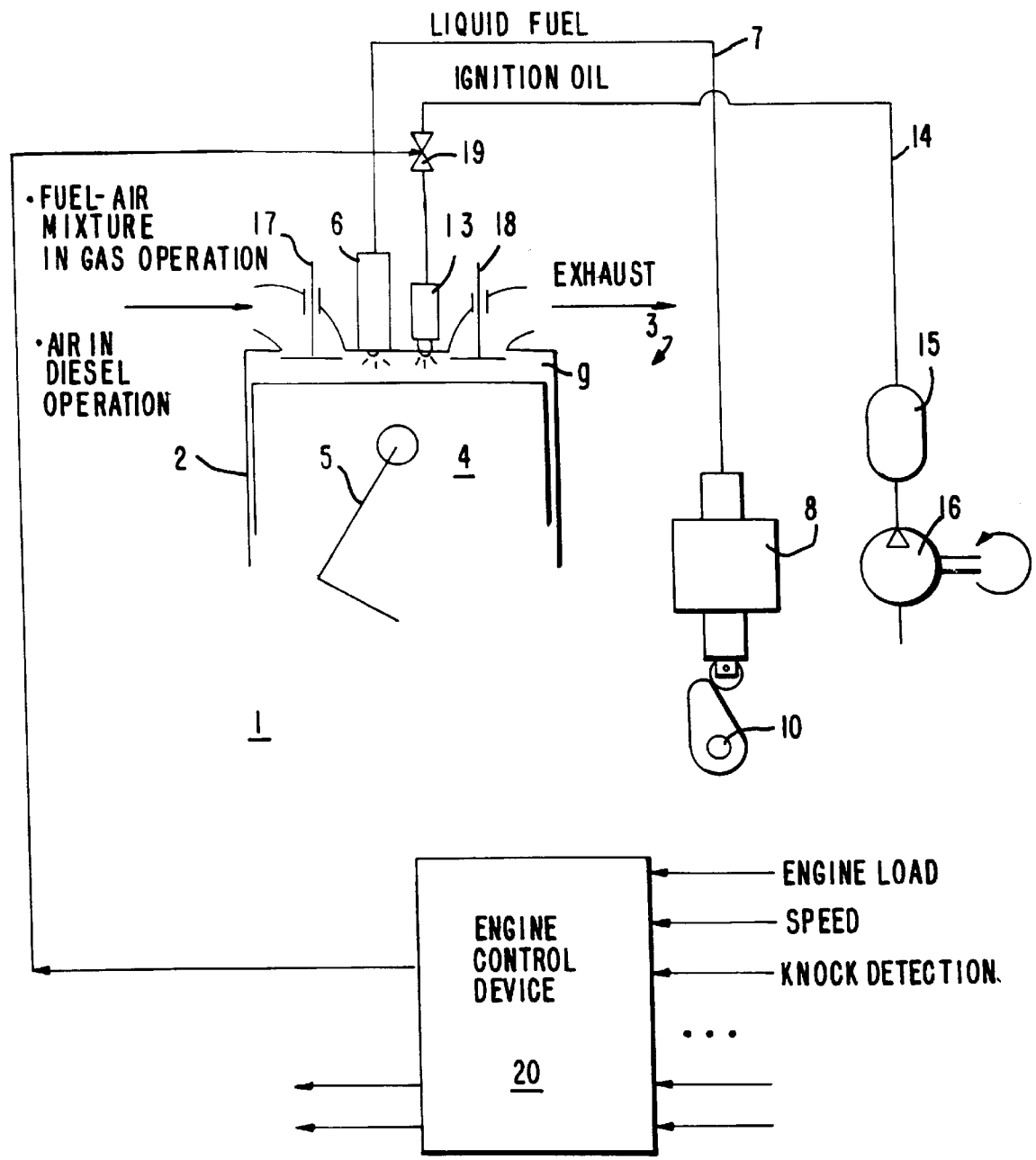
Figure 3:
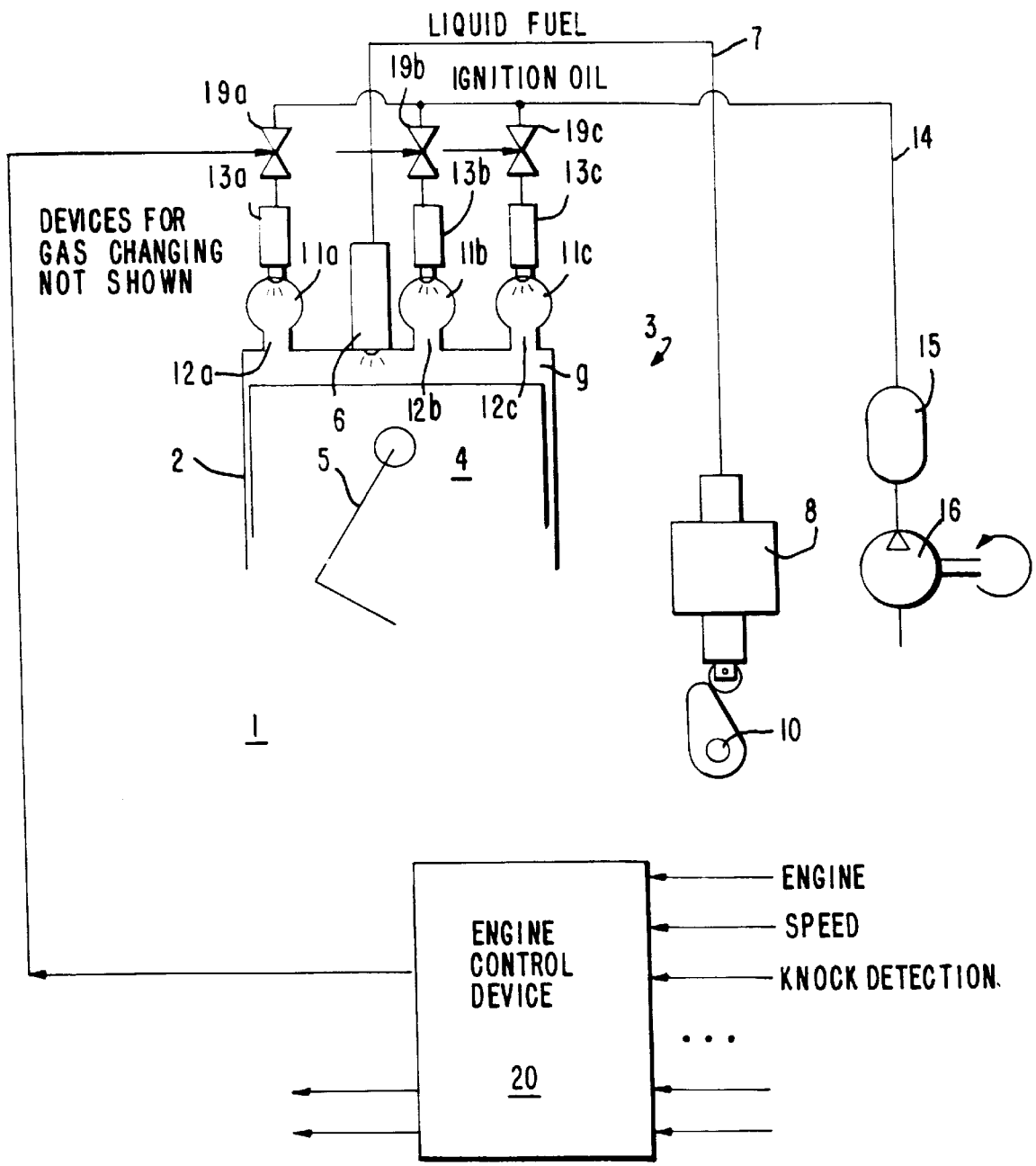
Figure 4:
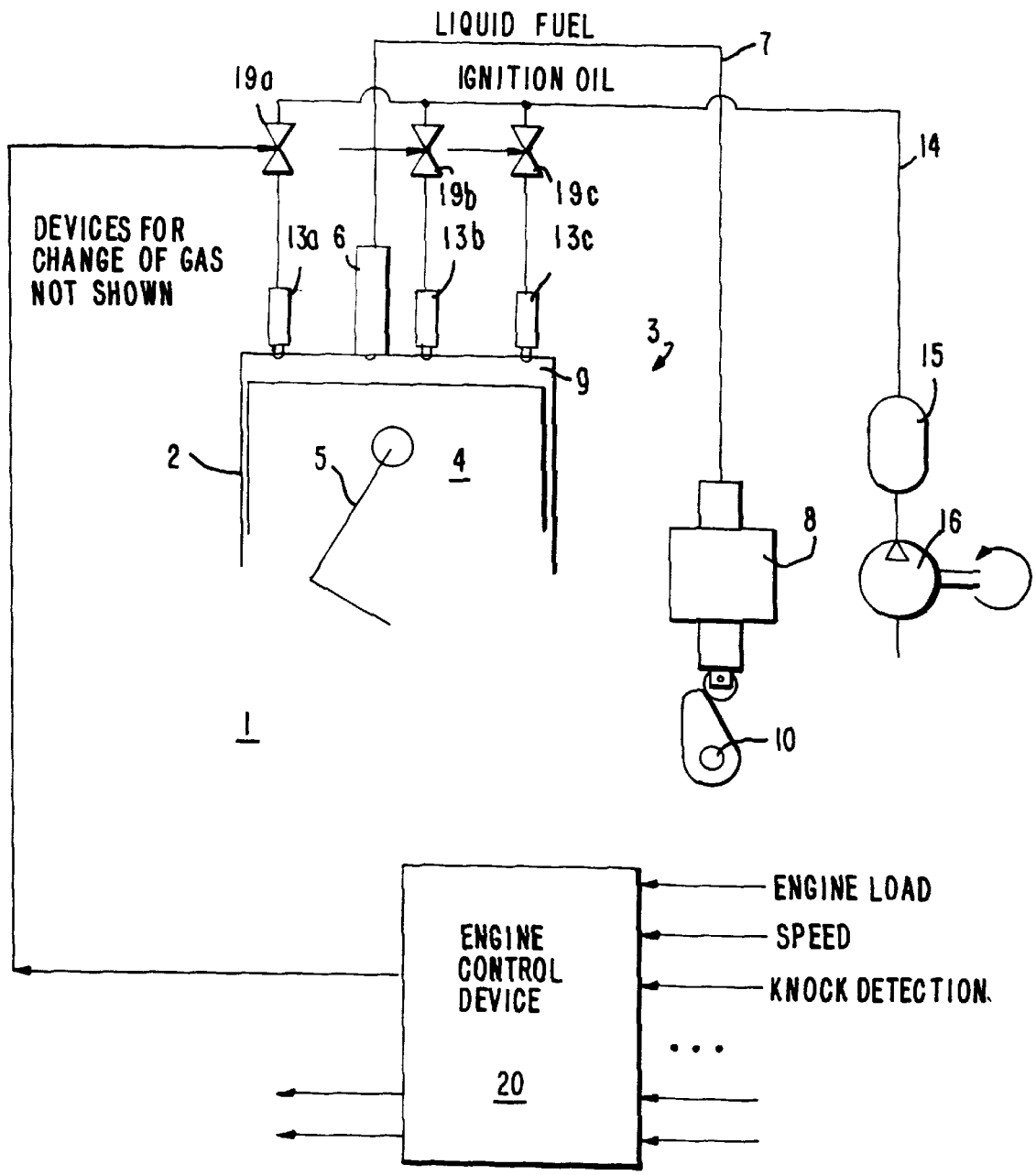

The elements shown in FIGS. 2 through 8 are the same as those shown in FIG. 1 and will not be discussed in further detail. FIGS. 2 through 4 represent different constructions of the diesel/gas engine 1 in accordance with the invention. FIG. 2 differs from that of FIG. 1 in that precombustion chamber 11 has been eliminated such that the ignition oil is injected directly into the main combustion chamber 9. In FIG. 3 the diesel/engine 1 is modified to include a plurality of precombustion chambers 11a, 11b, 11c, for each cylinder 2 of the engine. A plurality of injection devices 13a, 13b, 13c and a plurality of associated switching devices 19a, 19b, 19c are connected to the respective precombustion chambers 11a, 11b, 11c. Each of the switching devices 19a, 19b, 19c is electronically connected to the engine control device 20 and to the pressure accumulator 15 and ignition oil hydraulic pump 16 by the injection line 14. The diesel/engine 1 in FIG. 4 differs from that shown in FIG. 3 in that the plurality of precombustion chambers have been eliminated so that the ignition oil from the plurality of ignition oil injection devices 13a, 13b, 13c for each cylinder 2 is injected directly into the main combustion chamber 9.

Figure 5:
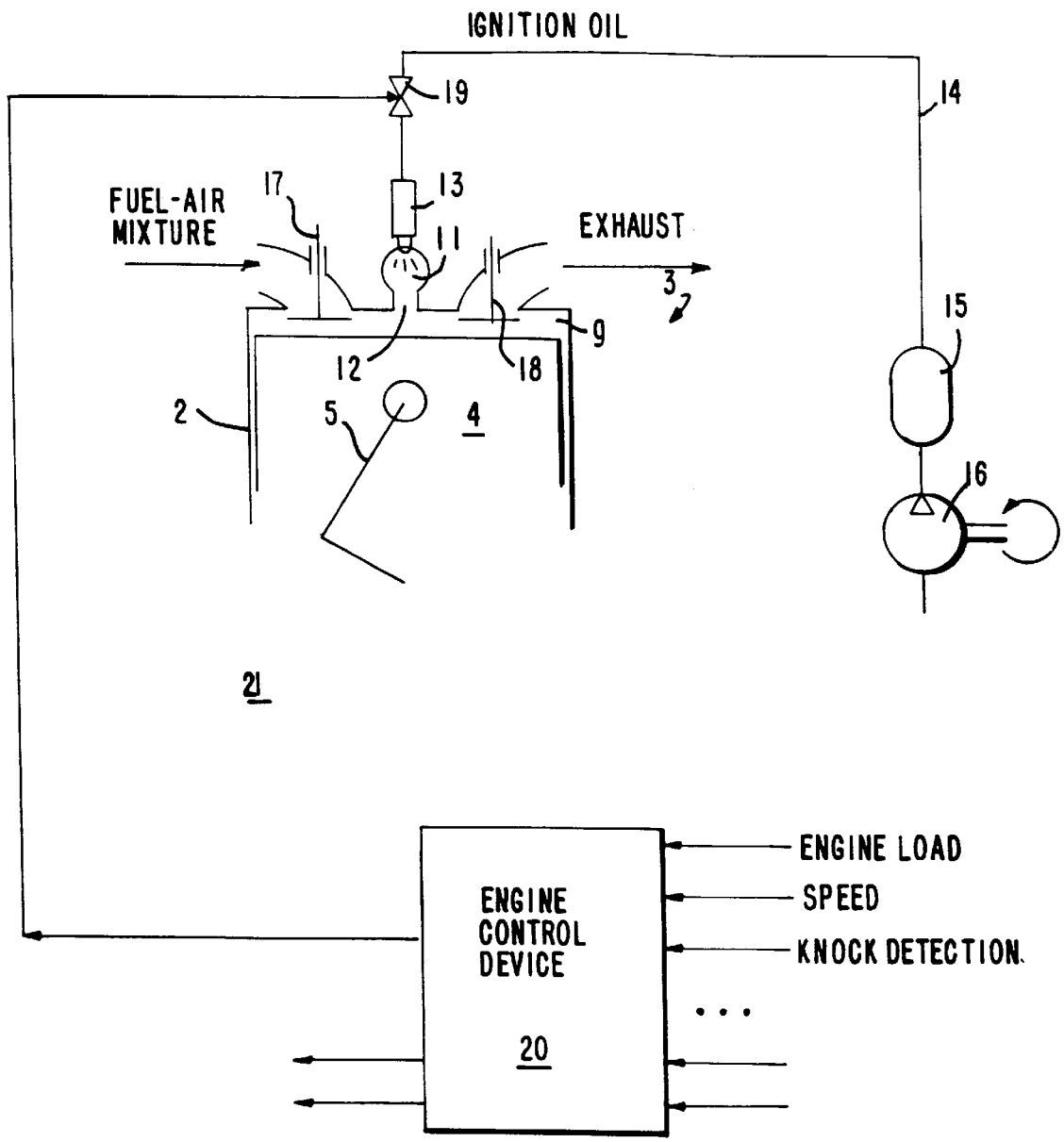
FIGS. 5 through 8 depict various embodiments of the pilot-injection gas engine with electronically controlled ignition oil injection in accordance with the invention.
Figure 6:
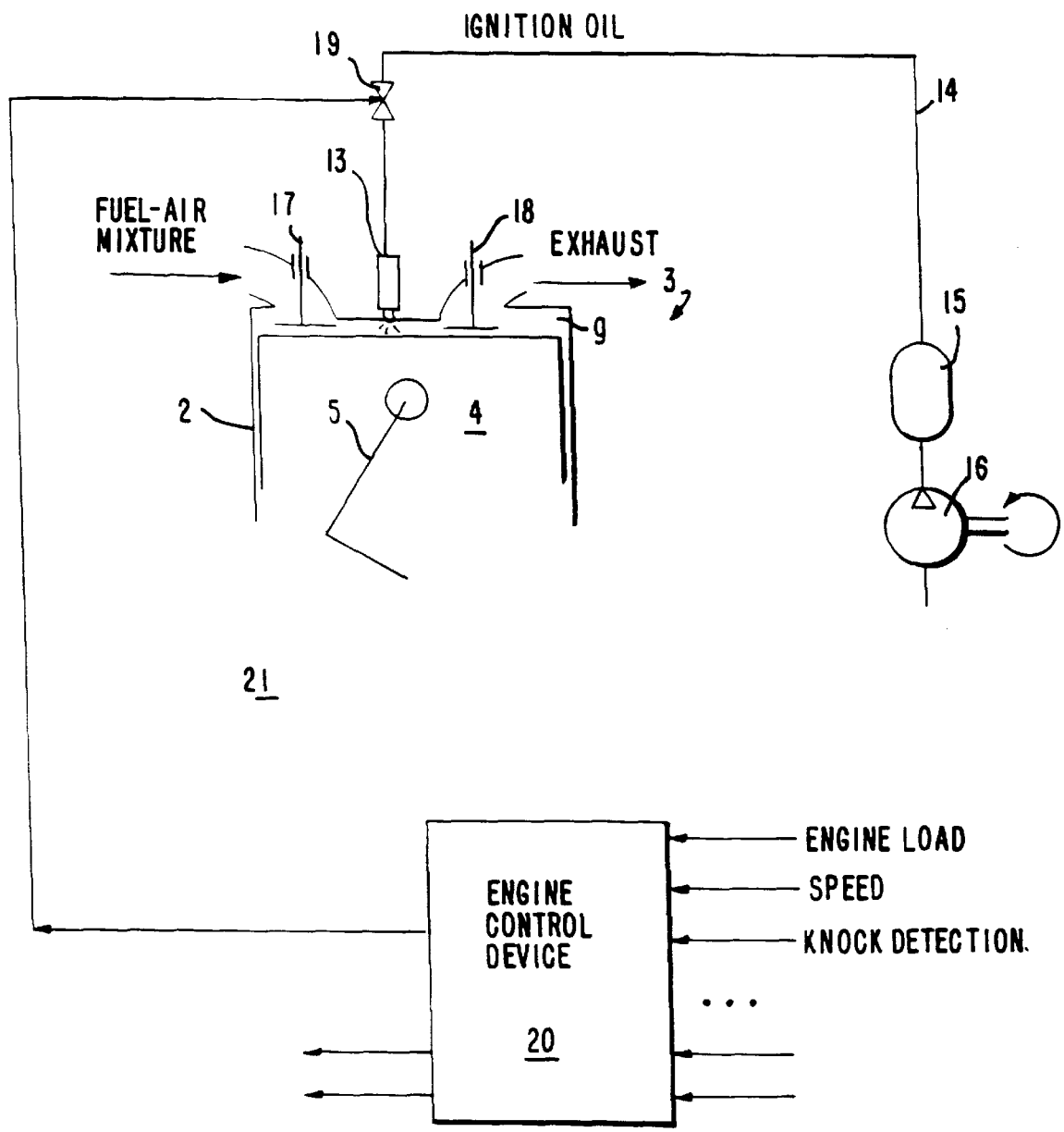
Figure 7:
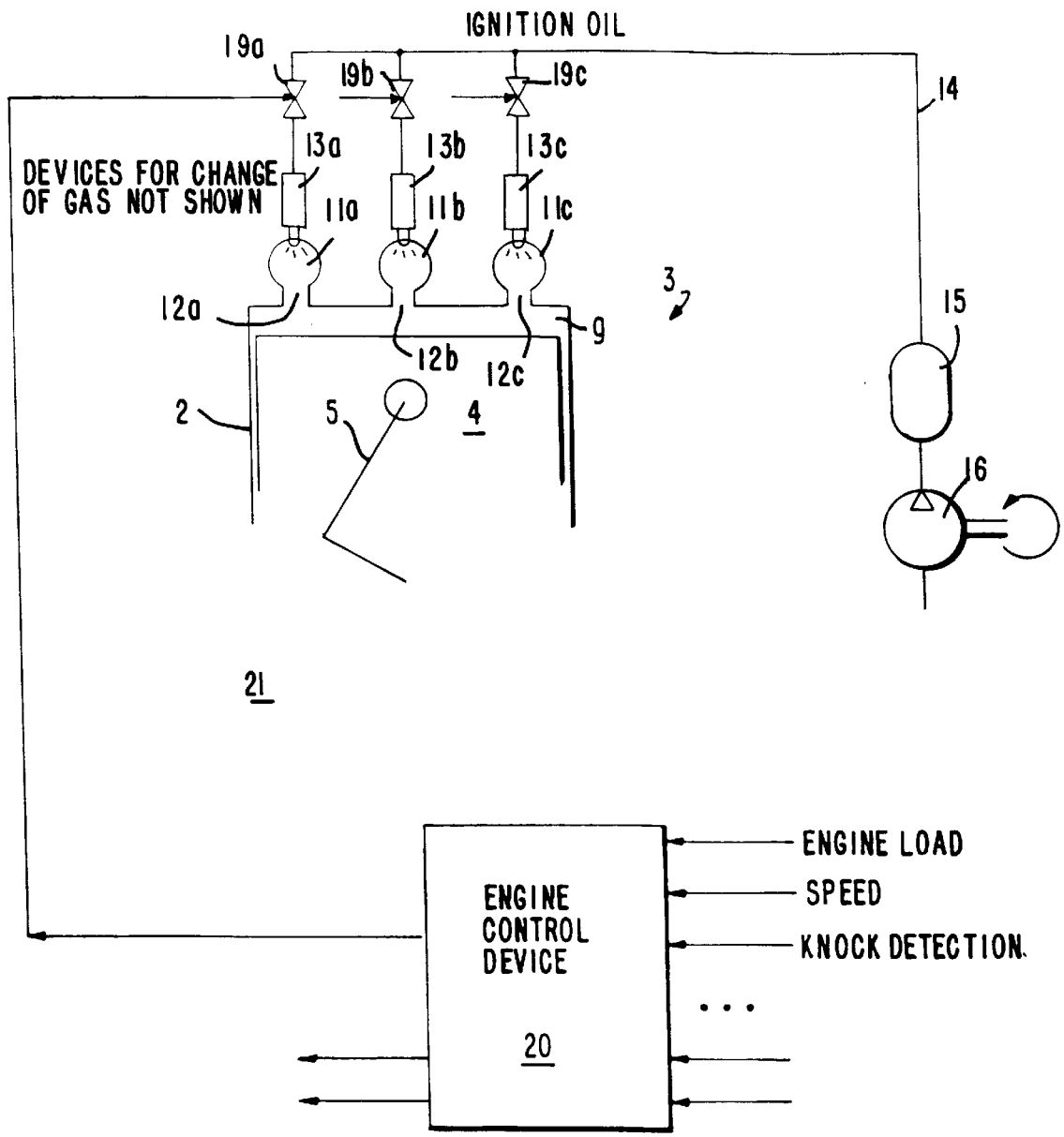
Figure 8:
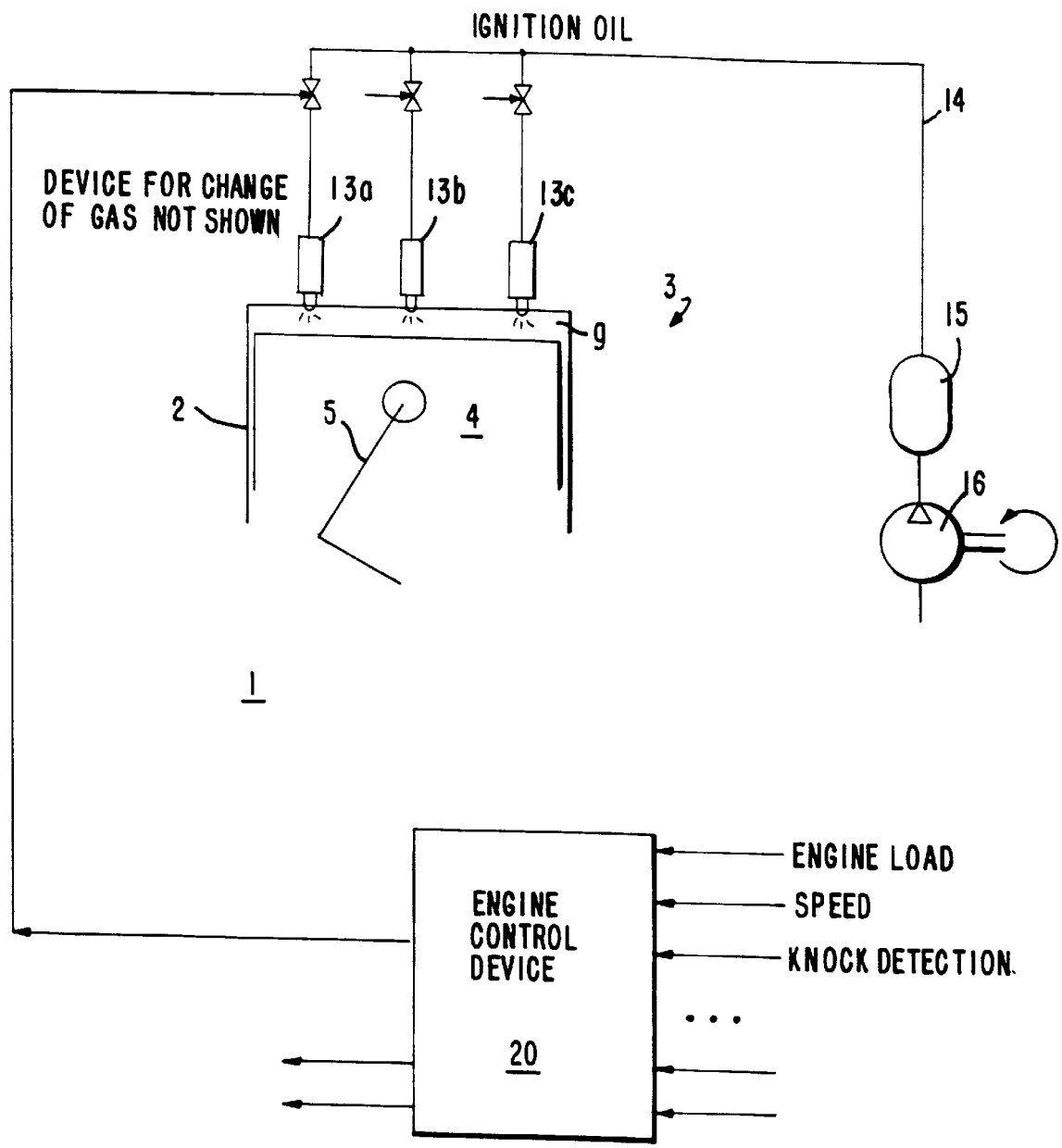

FIGS. 5 through 8 show a pilot-injection gas engine 21 with electronically controlled ignition oil injection in accordance with the invention. In FIG. 5 the pilot-injection gas engine 21 is constructed such that the ignition oil is injected into the precombustion chamber 11. The pilot-injection gas engine 21 in FIG. 6 differs from that shown in FIG. 5 in that the precombustion chamber 11 has been eliminated and the ignition oil is injected directly into the main combustion chamber 9. FIG. 7 shows the pilot-injection gas engine 21 with the injection of ignition oil into a plurality of precombustion chambers 11a, 11b, 11c. The pilot-injection gas engine 21 shown in FIG. 8 differs from that shown in FIG. 7 in that the plurality of precombustion chambers have been eliminated and the ignition oil is injected directly into the main combustion chamber 9 by the plurality of ignition oil injection devices 13a, 13b, 13c associated with each cylinder 2.

For purposes of illustration only, FIGS. 3, 4, 7 and 8 show three ignition oil injection devices and associated components for cylinder 2, however, any desired number of ignition oil injection devices and associated components per cylinder are contemplated and within the intended scope of the invention. In addition, although only one cylinder 2 is shown in the figures, more than one cylinder per engine is within the intended scope of the invention.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A gas engine with electronically controlled injection of ignition oil in a cylinder having a head, said engine comprising:

an injection device disposed in the cylinder head;

an ignition oil hydraulic pump connected to said injection device by an injection line;

a pressure accumulator in fluid communication with said ignition oil hydraulic pump;

an electronically controllable switching device operatively connected to said injection device; and an engine control device electrically connected to said switching device for controlling, regulating and monitoring ignition oil injection.

2. The gas engine in accordance with claim 1, wherein the engine is a diesel/gas engine.

3. The gas engine in accordance with claim 1, wherein the engine is a pilot-injection gas engine in which gas is used exclusively as a principal fuel.

4. The gas engine in accordance with claim 1, further comprising a piston disposed so as to be axially displaceable within the cylinder, the cylinder and piston together defining a combustion chamber.

5. The gas engine in accordance with claim 4, wherein the combustion chamber is undivided.

6. The gas engine in accordance with claim 5, wherein said injection device and the combustion chamber are in direct fluid communication with one another.

7. The gas engine in accordance with claim 4, wherein the combustion chamber is divided into a main combustion chamber and a precombustion chamber which are connected to one another by a connecting channel.

8. The gas engine in accordance with claim 7, wherein said injection device is in direct fluid communication with the precombustion chamber.

9. The gas engine in accordance with claim 1, wherein said engine control device further comprises a control program for controlling said switching device; the control program storing injection parameters of duration and beginning of injection based on at least one operating condition selected from the group consisting of engine load, engine speed, combustion gas characteristics and occurrence of knocking.

10. The gas engine in accordance with claim 9, wherein the control program is programmed so as to flexibly prevent knocking.

11. The gas engine in accordance with claim 1, wherein said switching device and said injection device associated therewith are integrated into a single structural device so that supply pressure of the ignition oil is applied until immediately before said injection device.

* * * * *